(12) United States Patent
Galloway et al.

(10) Patent No.: US 10,298,882 B1
(45) Date of Patent: May 21, 2019

(54) DEVICE, SYSTEM AND METHOD FOR EMBEDDED VIDEO CHAT

(71) Applicant: BUILDSCALE, INC., Kitchener (CA)

(72) Inventors: Devon Bruce Galloway, Kitchener (CA); Chris Landry, Woodstock (CA); Jivan Rabindra Ramsahai, Waterloo (CA); Tyler James Campaigne, Kitchener (CA)

(73) Assignee: BUILDSCALE, INC., Kitchener, Ontario (CA)

( * ) Notice: Subject to any disclaimer, the term of this patent is extended or adjusted under 35 U.S.C. 154(b) by 0 days.

(21) Appl. No.: 16/053,975

(22) Filed: Aug. 3, 2018

(51) Int. Cl.
H04N 7/14 (2006.01)
H04N 7/15 (2006.01)
G06F 9/445 (2018.01)

(52) U.S. Cl.
CPC ......... H04N 7/147 (2013.01); G06F 9/44526 (2013.01); H04N 7/15 (2013.01)

(58) Field of Classification Search
USPC .......................................... 348/14.01–14.09
See application file for complete search history.

(56) References Cited

U.S. PATENT DOCUMENTS

| 2011/0109715 | A1* | 5/2011 | Jing | H04N 7/147 348/14.08 |
| 2014/0126708 | A1* | 5/2014 | Sayko | H04M 11/00 379/93.01 |
| 2016/0173430 | A1* | 6/2016 | Foladare | H04L 67/26 709/206 |
| 2016/0380811 | A1* | 12/2016 | Bhogal | H04L 65/1069 709/223 |

* cited by examiner

Primary Examiner — Maria El-Zoobi
(74) Attorney, Agent, or Firm — Perry + Currier Inc.

(57) ABSTRACT

A device, system and method for embedded video chat is provided. A device renders, at a display device, a text-based application that includes a region for rendering an embeddable video chat application. The device retrieves, using a communication interface, from a server, the embeddable video chat application associated with an identifier. The device embeds the embeddable video chat application in the region of the display device. The device identifies, using the embeddable video chat application as retrieved from the server, a remote instance of the embeddable video chat application also identified using the identifier. The device initiates a video communication session with the remote instance of the embeddable video chat application using the display device and the camera device.

22 Claims, 15 Drawing Sheets

DEVICE, SYSTEM AND METHOD FOR EMBEDDED VIDEO CHAT

BACKGROUND

Video chats and/or video communication sessions are becoming ubiquitous. However, to implement video chat, applications dedicated to video communication sessions are generally implemented, for example as stand-alone dedicated applications, dedicated browser add-ins, and the like, which generally requires that the dedicated applications and/or browser add-ins, and the like, be installed at a computing device prior to initiating a video communication session. Such an approach can require that memory at the computing device be used to store the application and/or browser add-ins, even after the video communication session has ended; if the video communication session is to be a one-time video communication session, such use of memory is a waste of resources. Furthermore, such a requirement can cause delays in setting up a video chat and/or video communication session. For example, when a user browsing a webpage of a company, and the like, wishes to chat with a customer service representative of the company using a video communication session, prior to doing so, the dedicated applications and/or browser add-ins must be installed at the user's device. This can lead to delays in the video communication session and/or loss of sales, and the like, when the user is unable to determine how to install the dedicated applications and/or browser add-ins and/or decides to not install the dedicated applications and/or browser add-ins.

BRIEF DESCRIPTIONS OF THE DRAWINGS

For a better understanding of the various embodiments described herein and to show more clearly how they may be carried into effect, reference will now be made, by way of example only, to the accompanying drawings in which.

DETAILED DESCRIPTION

An aspect of the specification provides a device comprising: a communication interface; and a controller configured to communicate with a display device and a camera device, the controller further configured to: render, at the display device, a text-based application that includes a region for rendering an embeddable video chat application; retrieve, using the communication interface, from a server, the embeddable video chat application associated with an identifier; embed the embeddable video chat application in the region of the display device; identify, using the embeddable video chat application as retrieved from the server, a remote instance of the embeddable video chat application also identified using the identifier; and initiate a video communication session with the remote instance of the embeddable video chat application using the display device and the camera device.

Another aspect of the specification provides a method comprising: rendering, using a controller, at a display device, a text-based application that includes a region for rendering an embeddable video chat application, the controller configured to communicate with a communication interface, the display device and a camera device; retrieving, at the controller, using a communication interface from a server, the embeddable video chat application associated with an identifier; embedding, using the controller, the embeddable video chat application in the region of the display device; identifying, at the controller, using the embeddable video chat application as retrieved from the server, a remote instance of the embeddable video chat application also identified using the identifier; and initiating, at the controller, a video communication session with the remote instance of the embeddable video chat application using the display device and the camera device.

Another aspect of the specification provides a system comprising: a server having access to at least one memory storing an embeddable video chat application; a first device; and a second device, the server configured to: receive, from the first device, a request for the embeddable video chat application; provide, to the first device, the embeddable video chat application as identified by an identifier; and provide, to the second device, the embeddable video chat application also identified by the identifier, such that the embeddable video chat application is respectively embedded in a respective text-based application at each of the first device and the second device, the respective text-based application including a region for rendering the embeddable video chat application at a display device, the embeddable video chat application at each of the first device and the second device using the identifier to initiate a video communication session therebetween.

Figure 1:
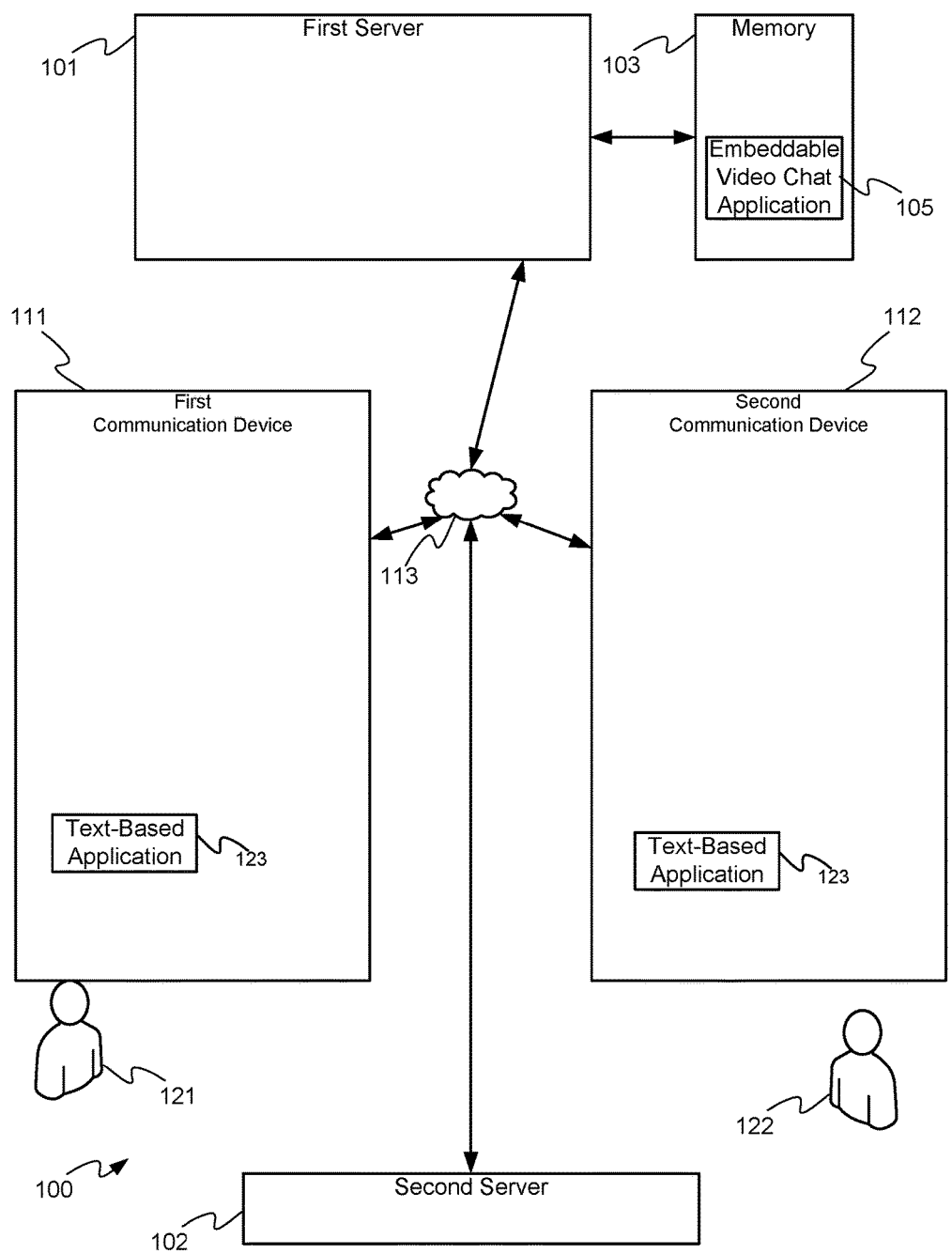
FIG. 1 depicts a system for setting up a video communication session using an embeddable video chat application, in accordance with some embodiments.

Attention is directed to FIG. 1 which depicts a system 100 for setting up a video communication session using an embeddable video chat application. System 100 comprises: a first server 101 for setting up an embedded video chat; an optional second server 102 for mediating and/or conducting the embedded video chat; at least one memory 103 (interchangeably referred to hereafter as the memory 103) storing an embeddable video chat application 105; a first communication device 111 (interchangeably referred to hereafter as the first device 111); and a second communication device 112 (interchangeably referred to hereafter as the second device 112). The servers 101, 102 are generally configured to set up and mediate a video chat (interchangeably referred to as a video communication session) between the devices 111, 112. The servers 101, 102 and the communication devices 111, 112 may communicate via a communication network 113 (interchangeably referred to hereafter as the network 113) and respective wired and/or wireless communication links with the network 113, depicted herein as arrows between the servers 101, 102, the communication devices 111, 112 and the network 113.

Each of the servers 101, 102 may include one or more computing devices and/or cloud-based computing devices and/or functionality of each of the servers 101, 102 may be distributed over two or more cloud-based devices.

The first server 101 has access to the memory 103, which may be a component of one or more database devices and/or a memory of the first server 101, and the like. While the at least one memory 103 is depicted as separate from the first server 101, the at least one memory 103 may be a component of the first server 101 and/or the second server 102 and/or another server and/or computing device of the system 100. Furthermore, while the first server 101 is depicted as being in communication with the memory 103 via a local communication link (e.g. not via the network 113), the first server 101 may alternatively be in communication with the memory 103 via the network 113.

Each of the devices 111, 112 may include one or more of a personal computer, a laptop computer, a mobile computing device, and the like. Indeed, in examples described herein, the device 111 may comprise a communication device, operated by a user 121 browsing the Internet, and the like, to initiate and conduct a video communication session with the device 112, for example to speak to a user 122 of the device 112. The second device 112 may, for example comprise a call center terminal (including, but not limited to a personal computer, a laptop computer, a mobile computing device, and the like) and a user 122 of the device may be a customer service representative, sales agent and/or call center agent. Indeed, the first sever 101 and the second device 112 may be associated with an entity operating a call center, and the like, such as a business entity. In general, video communication sessions described herein may be initiated at the device 111 (and/or the device 112) via a browser and/or webpage, without needing to install a dedicated video application and/or a browser plug-in, at the devices 111, 112; furthermore video communication sessions described herein may be occur without either of the devices 111, 112 dedicating on-going memory resources to storing a dedicated video application and/or a browser plug-in after the video communication session has ended.

Furthermore, while only two devices 111, 112 are depicted, the system 100 may comprise more than two devices 111, 112, including, but not limited to a plurality of devices 111 operated by a plurality of users 121 which may be used to communicate with one of a plurality of devices 112. For example, a plurality of users 121 may be using their devices 111 to communicate with one of a plurality of users 122 operating a plurality of devices 112, for example at a call center.

Furthermore, while present examples are described with respect to the user 121 using the device 111 to communicate with a call center representative (e.g. the user 122), in other examples, the user 122 may not be a call center representative; rather the users 121, 122 may be two individuals using their respective devices 111, 112 to communicate for personal and/or business reasons.

As described hereafter, at least the first server 101 is configured to set up a video communication session between the devices 111, 112 using the embeddable video chat application 105, as described in further detail below. In some examples, the first server 101 may cause the embeddable video chat application 105, identified by at least one identifier, to be downloaded to each of the devices 111, 112, while the second server 102 is configured to assist the devices 111, 112 in initiating the video communication session between the devices 111, 112 using the at least one identifier. However, in other examples, the functionality of the second server 102 may be implemented at the first server 101.

The embeddable video chat application 105 may comprise a video player, and the like, configured to utilize video resources at a device at which the embeddable video chat application 105 is implemented to conduct a video communication session. Such resources may include, but are not limited to, a camera device (including, but not limited to, a video device) and/or a microphone and/or speaker, as well as one or more communication interfaces, for example at the devices 111, 112.

When the embeddable video chat application 105 is downloaded to the devices 111, 112 to initiate a video communication session therebetween, the embeddable video chat application 105 is associated with an identifier which identifies and/or uniquely identifies and/or cryptographically uniquely identifies the embeddable video chat application 105. The identifier may include, but is not limited to, one or more of: cryptographically unique identifier; a universally unique identifier (UUID); and a parameter in a universal resource locator (URL) used to retrieve the embeddable video chat application 105 from the first server 101. Hence, the identifier may also be used by one or more of the devices 111, 112 to retrieve the embeddable video chat application 105 for embedding in a text-based application 123 at the devices 111, 112.

In particular, the embeddable video chat application 105 is generally embeddable in a text-based application 123 at each of the devices 111, 112, the text-based application 123 including a region for rendering the embeddable video chat application 105. The text-based application 123 generally comprises an application which is not inherently enabled for video chat and which may include, but is not limited to, one or more of a non-video application; a non-video chat application; a text chat application; a browser for rendering a webpage; and the like. Rather, the text-based application 123 may be configured to provide a combination of text and graphic. The text-based application 123 may be a component of the browser application and/or a webpage rendered by the browser application.

In examples provided herein, the text-based application 123 may comprise a browser rendering a webpage and the region for rendering the embeddable video chat application 105 may be defined by an embedding element in the webpage that includes a network address (such as a universal resource locator (URL) and the like) to retrieve the embeddable video chat application 105 from the first server 101, the identifier comprising a parameter of the network address. The embedding element in the webpage may comprise an <iframe> tag, an <embed> tag, and the like, included in the HyperText Markup Language (HTML) code of the webpage.

In some examples, the embedding element may include the network address of the embeddable video chat application 105 as stored at the memory 103, and also include the identifier of the embeddable video chat application 105; in these examples, the webpage that includes the network address of the embeddable video chat application 105 in the embedding element may be stored at the memory 103, and the like, and downloaded by the first device 111, for example when a user is operating the first device 111 and the text-based application 123 to browse the Internet.

Alternatively, the text-based application 123 may comprise a text chat application and the region for rendering the embeddable video chat application 105 may be defined by a network address received as text in the text chat application, the network address used to retrieve the embeddable video chat application 105 from the first server 101, the identifier comprising a parameter of the network address. For example, the text chat application may be a text chat application downloaded in a webpage (e.g. as component of the webpage), the text chat application for communicating with a customer service representative, and the like, the region for rendering the embeddable video chat application 105 may be in the webpage and used to download the embeddable video chat application 105 to initiate a video communication session during a text chat session.

Further examples of the embeddable video chat application 105 and the text-based application 123 are described below.

Figure 2:
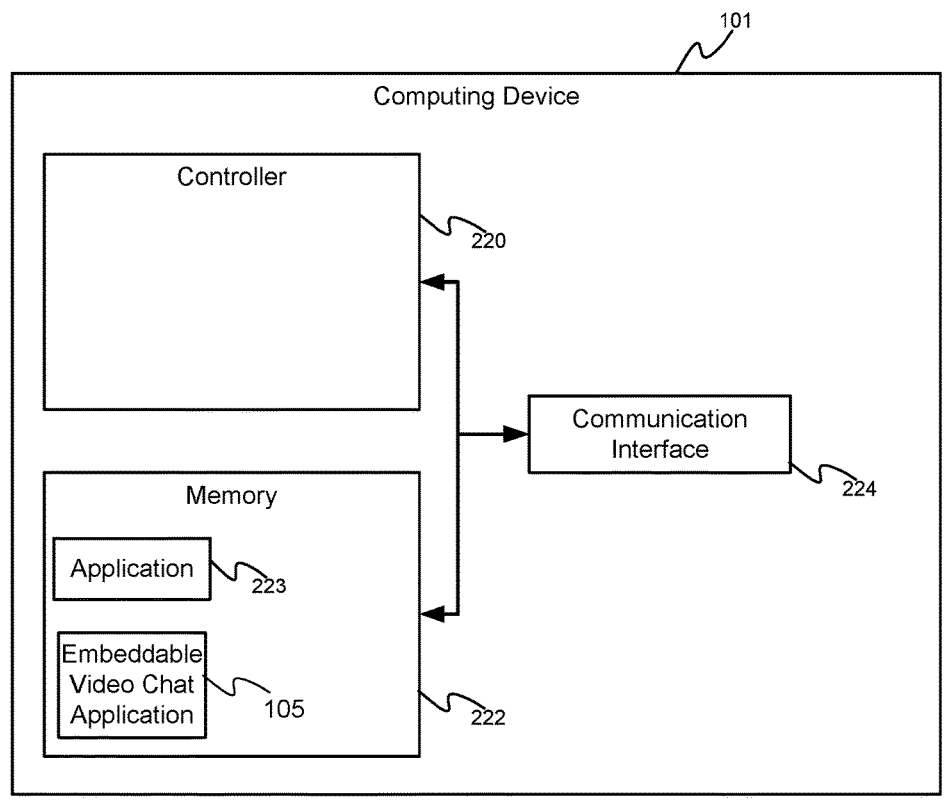
FIG. 2 depicts a device diagram showing a device structure of an electronic computing device and/or server for setting up a video communication session using an embeddable video chat application, in accordance with some embodiments.

Attention is next directed to FIG. 2 which depicts a device diagram showing a device structure of the first server 101 and/or a server for setting up a video communication session using the embeddable video chat application 105 according to some embodiments. Furthermore, the first server 101 may be a distributed computing device distributed across two or more of the foregoing (or multiple of a same type of one of the foregoing) and in communication via a wired and/or wireless communication connection(s) and/or path(s); in some of these embodiments, the first server 101 may be implemented in a cloud computing environment. Furthermore, the second server 102, when present, may have a structure similar to the first server 101, adapted, however, for the functionality of the second server 102.

The first server 101 comprises a controller 220, a memory 222 storing an application 223 (and optionally, as depicted, the embeddable video chat application 105), and a communication interface 224 (interchangeably referred to hereafter as the interface 224) interconnected, for example, using a computer bus.

While not depicted, the first server 101 may further include one or more input devices, one or more display devices, one or more speakers, one or more microphones, one or more cameras, one or more location determining devices, and/or other types of components.

The controller 220 can comprise a processor and/or a plurality of processors, including but not limited to one or more central processors (CPUs) and/or one or more processing units; either way, the controller 220 comprises a hardware element and/or a hardware processor. Indeed, in some implementations, the controller 220 can comprise an ASIC (application-specific integrated circuit) and/or an FPGA (field-programmable gate array) specifically configured to implement functionality for setting up a video communication session using the embeddable video chat application 105. Hence, the first server 101 is preferably not a generic computing device, but a device specifically configured to implement specific functionality for setting up a video communication session using the embeddable video chat application 105. For example, the first server 101 and/or the controller 220 can comprise a computer executable engine configured to implement specific functionality for setting up a video communication session using the embeddable video chat application 105.

The memory 222 can comprise a non-volatile storage unit (e.g. Erasable Electronic Programmable Read Only Memory ("EEPROM"), Flash Memory) and a volatile storage unit (e.g. random-access memory ("RAM")). Programming instructions that implement the functional teachings of the first server 101 as described herein are typically maintained, persistently, in the memory 222 and used by the controller 220 which makes appropriate utilization of volatile storage during the execution of such programming instructions. Those skilled in the art recognize that the memory 222 is an example of computer readable media that can store programming instructions executable on the controller 220. Furthermore, the memory 222 is also an example of a memory unit and/or memory module and/or a non-volatile memory.

The memory 222, as depicted, stores the embeddable video chat application 105; hence, the memory 222 may comprise the memory 103 of FIG. 1. However, alternatively, the memory 222 may not store the embeddable video chat application 105

In particular, the memory 222 stores the application 223 that, when processed by the controller 220, enables the controller 220 and/or the first server 101 to: receive, from a first device (e.g. the first device 111), a request for the embeddable video chat application 105; provide, to the first device, the embeddable video chat application 105 as identified by an identifier; and provide, to a second device (e.g. the second device 112), the embeddable video chat application 105 also identified by the identifier, such that the embeddable video chat application 105 is respectively embedded in a respective text-based application 123 at each of the first device and the second device, the respective text-based application including a region for rendering the embeddable video chat application 105 at a display device, the embeddable video chat application 105 identified at each of the first device and the second device using the identifier to initiate a video communication session therebetween.

The communication interface 224 comprises a wired or wireless network interface which may include, but is not limited to, any suitable combination of serial ports, parallel ports, USB ports (Universal Serial Bus), and cables therefore, one or more broadband and/or narrowband transceivers, such as a cellular network transceiver, a wireless radio, a cell-phone radio, a cellular network radio, a Bluetooth™ radio, a NFC (near field communication) radio, a WLAN (wireless local area network) radio, a WiFi radio (e.g. one or more local area network or personal area network transceivers operating in accordance with an IEEE 802.11 standard (e.g., 802.11a, 802.11b, 802.11g)), a WiMax (Worldwide Interoperability for Microwave Access, operating in accordance with an IEEE 902.16 standard) radio, a packet based interface, an Internet-compatible interface, an analog interface, a PSTN (public switched telephone network) compatible interface, and the like, and/or a combination.

Figure 3:
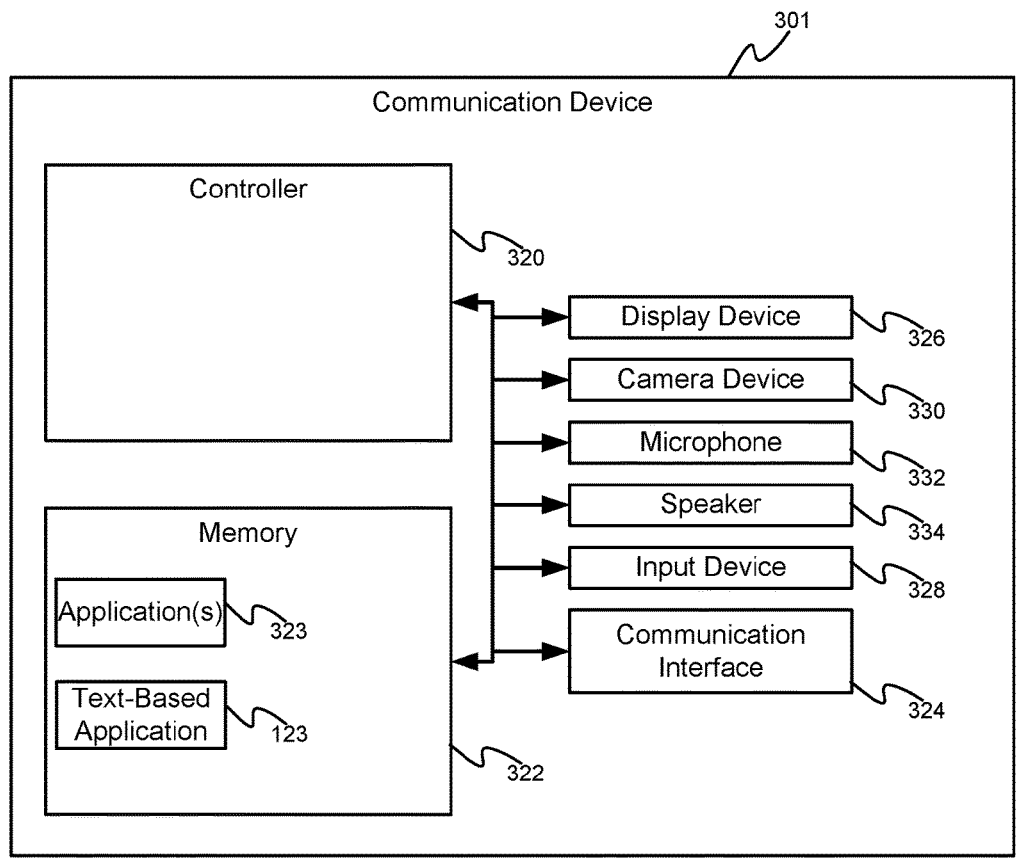
FIG. 3 depicts a device diagram showing a device structure of an electronic communication device for conducting a video communication session using an embeddable video chat application, in accordance with some embodiments.

Attention is next directed to FIG. 3 which depicts a device diagram showing a device structure of an example electronic communication device 301 for conducting an embedded video chat according to some embodiments. The device 301 may be, for example, embodied in each of the devices 111, 112, and/or some other computing and/or communication device not illustrated in FIG. 1. Furthermore, the device 301 may be a distributed computing and/or communication device and in communication via a wired and/or wireless communication connection(s) and/or path(s); in some of these embodiments, the device 301 may be implemented in a cloud computing environment. For example, when the device 301 is embodied in the first device 111, the device 301 may comprise a personal computing device, a laptop and/or a mobile computing device; however, when the device 301 is embodied in the second device 112, the device 301 may comprise a cloud-based computing device including a call center terminal.

The device 301 comprises a controller 320, a memory 322 storing an application 323 and the text-based application 123, a communication interface 324 (interchangeably referred to hereafter as the interface 324), a display device 326 one or more input devices 328, a camera device 330, a microphone 332, and a speaker 334, interconnected, for example, using a computer bus. The application 323 may be for implementing general functionality of device 301 including, but not limited to, processing and/or implementing the text-based application 123 and/or assisting the text-based application 123 to implement functionality thereof. Furthermore, while the application 123, 323 are depicted as separate applications, in other examples, the application 123, 323 may be combined, for example with one of the applications 123, 323 being a component of the other. However, the functionality of the device 301 relating to initiating and conducting a video communication session occurs via the embeddable video chat application 105 being downloaded via the first server 101, described in detail below.

The controller 320 can comprise a processor and/or a plurality of processors, including but not limited to one or more central processors (CPUs) and/or one or more processing units; either way, the controller 320 comprises a hardware element and/or a hardware processor. Indeed, in some implementations, the controller 320 can comprise an ASIC (application-specific integrated circuit) and/or an FPGA (field-programmable gate array) configured to implement functionality for implementing the text-based application 123 including setting up a video chat using the embeddable video chat application 105 when downloaded from the first server 101.

However, in general neither the controller 320 nor the device 301 may be specifically configured for conducting a video communication session and/or for video chat; for example, neither the controller 320 nor the device 301 may include applications and/or browser add-ins for video chat. However, the device 301 generally includes components that may be used for conducting a video chat, such as the display device 326 and the camera device 330 (as well as the microphone 332 and the speaker 334). Hence, the device 301 may be enabled to initiate and conduct a video communication session by way of downloading the embeddable video chat application 105 in the text-based application 123.

The memory 322 can comprise a non-volatile storage unit (e.g. Erasable Electronic Programmable Read Only Memory ("EEPROM"), Flash Memory) and a volatile storage unit (e.g. random-access memory ("RAM")). Programming instructions that implement the functional teachings of the device 301 as described herein are typically maintained, persistently, in the memory 322 and used by the controller 320 which makes appropriate utilization of volatile storage during the execution of such programming instructions. Those skilled in the art recognize that the memory 322 is an example of computer readable media that can store programming instructions executable on the controller 320. Furthermore, the memory 322 is also an example of a memory unit and/or memory module and/or a non-volatile memory.

In particular, the memory 322 stores the application 323 and the text-based application 123 that, when processed by the controller 320, enables the controller 320 and/or the device 301 to: render, at the display device 326, the text-based application 123 that includes a region for rendering the embeddable video chat application 105; retrieve, using the communication interface 324, from a server (e.g. the first server 101), the embeddable video chat application 105 associated with an identifier; embed the embeddable video chat application 105 in the region of the display device 326; identify, using the embeddable video chat application 105 as retrieved from the server, a remote instance of the embeddable video chat application 105 also identified using the identifier; and initiate a video communication session with the remote instance of the embeddable video chat application 105 using the display device 326 and the camera device 330.

The communication interface 324 comprises a wired or wireless network interface which may include, but is not limited to, any suitable combination of serial ports, parallel ports, USB ports (Universal Serial Bus), and cables therefore, one or more broadband and/or narrowband transceivers, such as a cellular network transceiver, a wireless radio, a cell-phone radio, a cellular network radio, a Bluetooth™ radio, a NFC (near field communication) radio, a WLAN (wireless local area network) radio, a WiFi radio (e.g. one or more local area network or personal area network transceivers operating in accordance with an IEEE 802.11 standard (e.g., 802.11a, 802.11b, 802.11g)), a WiMax (Worldwide Interoperability for Microwave Access, operating in accordance with an IEEE 902.16 standard) radio, a packet based interface, an Internet-compatible interface, an analog interface, a PSTN (public switched telephone network) compatible interface, and the like, and/or a combination.

The display device 326 and the camera device 330, as well as the microphone 332 and the speaker 334, are generally configured to be used to conduct a video communication session. The display device 326 may comprise a flat panel display device, the camera device 330 may comprises a video device, and one or more of the microphone 332 and the speaker 334 may be components of the camera device 330 and/or components separate from the camera device 330. In yet further examples, one or more of the display device 326, the camera device 330, the microphone 332 and the speaker 334 may be external to the device 301. Regardless, the controller 320 is generally configured to communicate with the display device 326, the camera device 330 (and optionally the microphone 332 and/or the speaker 334, for example when the camera device 330 does not include a microphone and/or speaker).

While not depicted, the device 301 may comprise other types of components including, but not limited to, one or more location determining devices (e.g. a Global Positioning System (GPS) device and the like)

Figure 4:
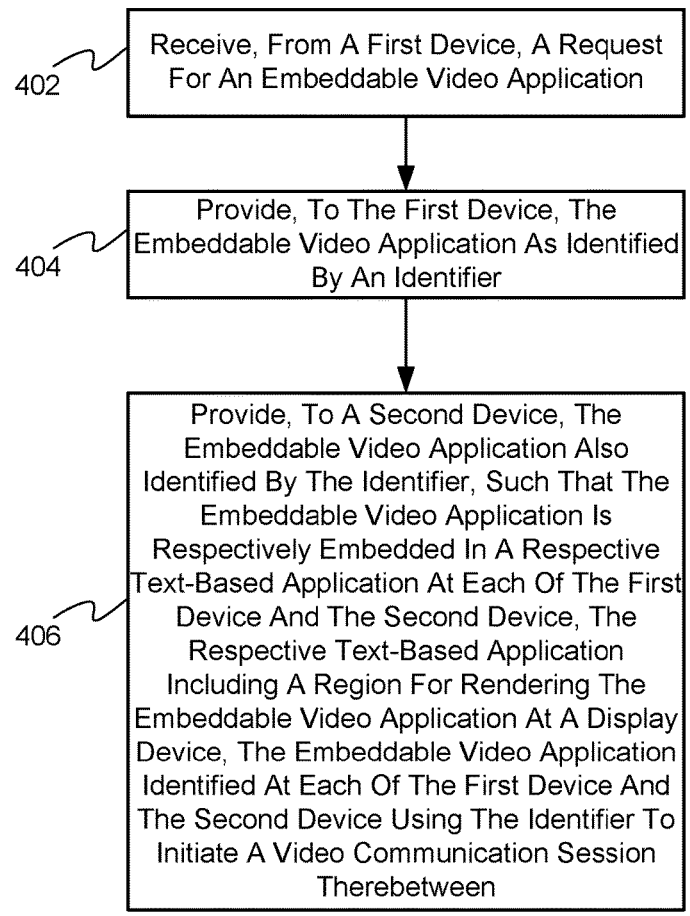
FIG. 4 depicts a flowchart of a method setting up a video communication session using an embeddable video chat application, in accordance with some embodiments.

Attention is now directed to FIG. 4, which depicts a flowchart of a method 400 for embedded video chat, according to non-limiting implementations. In order to assist in the explanation of the method 400, it will be assumed that the method 400 is performed using the controller 220 of the first server 101, for example when the controller 220 processes the application 223. Indeed, method 400 is one way in which the first server 101 and/or the controller 220 can be configured. Furthermore, the following discussion of the method 400 will lead to a further understanding of the first server 101, and the system 100, and their various components. However, it is to be understood that the system 100 and/or the first server 101 and/or the controller 220 and/or the method 400 can be varied and need not work exactly as discussed herein in conjunction with each other, and that such variations are within the scope of present implementations.

Regardless, it is to be emphasized, that the method 400 need not be performed in the exact sequence as shown, unless otherwise indicated; and likewise, various blocks may be performed in parallel rather than in sequence; hence the elements of the method 400 are referred to herein as "blocks" rather than "steps". It is also to be understood, however, that the method 400 can be implemented on variations of the first server 101 as well.

Furthermore, while it is assumed hereafter that the method 400 is performed at the first server 101, the method 400 may be performed at one or more devices of the system 100, for example at a combination of the servers 101, 102. Furthermore, while the method 400 is described hereafter with regards to the first server 101 communicating with the devices 111, 112, the first server 101 (and the like) may perform the method 400 by communicating with other devices similar to the devices 111, 112.

At a block 402, the controller 220 receives, from a first device (e.g. the first device 111), a request for the embeddable video chat application 105. For example, the user 121 of the first device 111 may interact with the text-based application 123 at the first device 111 to request the embeddable video chat application 105, as described in more detail below. The request may include a network address of the embeddable video chat application 105 as stored at the memory 103 and/or the memory 222.

At a block 404, the controller 220 provides, to the first device 111, the embeddable video chat application 105 as identified by an identifier. In some examples, the identifier is received with the request at the block 402, for example as a parameter of the network address. In other examples, the identifier is generated by the controller 220. In yet further examples the identifier is generated by the controller 220 and provided to the first device 111 and/or the text-based application 123 prior to receiving the request at the block 402, for example as embedded in a webpage, and the like. In general, the identifier identifies an instance of the embeddable video chat application 105, for example an instance of the embeddable video chat application 105 to be embedded in the text-based application 123 at the first device 111.

At a block 404, the controller 220 provides, to a second device (e.g. the second device 112), the embeddable video chat application 105 also identified by the identifier; hence the identifier identifies each instance of the embeddable video chat application 105 embedded in the text-based application 123 at each of the device 111, 112. In particular, the embeddable video chat application 105 (each identified by the identifier) is respectively embedded in a respective text-based application 123 at each of the first device 111 and the second device 112, the respective text-based application 123 including a region for rendering the embeddable video chat application 105 at a display device, the embeddable video chat application 105 identified at each of the first device 111 and the second device 112 using the identifier to initiate a video communication session therebetween.

The first server 101 may push the embeddable video chat application 105 to the second device 112 with the identifier. Alternately, the second device 112 may already have downloaded the embeddable video chat application 105 in a respective instance of the text-based application 123 and, at the block 404, the controller 220 may first provide the embeddable video chat application 105 to the second device 112, and then later provide the identifier to the second device 112 for association with the previously received identifier. In particular, the block 404 may be implemented in a two-step process in which the embeddable video chat application 105 is first provided to the second device 112 (e.g. before one or more of the block 402 and the block 404 occurs) and the identifier may be later provided to the second device 112 after the request is received at the block 402 and the embeddable video chat application 105 provided to the first device 111 and associated with the identifier.

For example, the second device 112 may have requested an instance of the embeddable video chat application 105 within an instance of the text-based application 123 at the second device 112, the second device 112 being queued at the first server 101 to enter a video communication session with other devices, such as the first device 111, that may request a video communication session, for example to speak with a customer service representative and the like. The identifier may be assigned to the embeddable video chat application 105 when the embeddable video chat application 105 is provided to the second device 112 and/or assigned to the embeddable video chat application 105 at the second device 112 when the request for the embeddable video chat application 105 is received at the block 402 from the first device 111.

Regardless, the controller 220 provides the embeddable video chat application 105 to each of the first device 111 and the second device 112 associated with the identifier. However, each instance of the embeddable video chat application 105 at the devices 111, 112 need not be identical; for example, the devices 111, 112 may have different versions and/or different types of the embeddable video chat application 105 embedded at a respective text-based application 123, as long as each instance of the embeddable video chat application 105 at each of the devices 111, 112 is identified by the same identifier.

In some examples, the embeddable video chat application 105 at each of the first device 111 and the second device 112, once embedded in respective text-based applications 123, may request a session identifier for use in setting up the video communication session therebetween. Indeed, such a session identifier may identify a current session during which a video communication session is to occur. For example, prior to initiating the video communication session, each instance of the embeddable video chat application 105 at each of the first device 111 and the second device 112 may request the session identifier from the first server 101, the session identifier identifying a current session. In some examples, the session identifier may be used in conjunction with a manifest used in streaming video according to the HTTP (Hypertext Transfer Protocol) Live Streaming (HLS)

protocol, which may include a list of "videos" to be "played" by the embeddable video chat application 105, for example, when the embeddable video chat application 105 comprises a video player. However, at least one of the videos in the list may include data (such as the session identifier) identifying that a live video chat session is to occur rather than a video to be played. Indeed, in some examples, the only video in the manifest may be the data identifying that a live video chat session is to occur. However, in other examples the manifest may include a video to be played prior to the live video chat session, for example, to provide information to the user of at least the first device 111 and/or to place the user of at least the first device 111 on "hold" until a user of the second device 112 is able to participate in the video communication session. The manifest may be modified by the device 301 to include the data (such as the session identifier) identifying that a live video chat session is to occur once the user of the second device 112 indicates (e.g. using an input device) that they are available to participate in a video communication session.

Indeed, in these examples, the live video chat session may be provided as streaming video to the embeddable video chat application 105 at each of the devices 111, 112.

Furthermore, the second server 102 may be used to configure the video communication session once each of the devices 111, 112 are provided with the embeddable video chat application 105 and the identifier, and optionally the session identifier.

Figure 5:
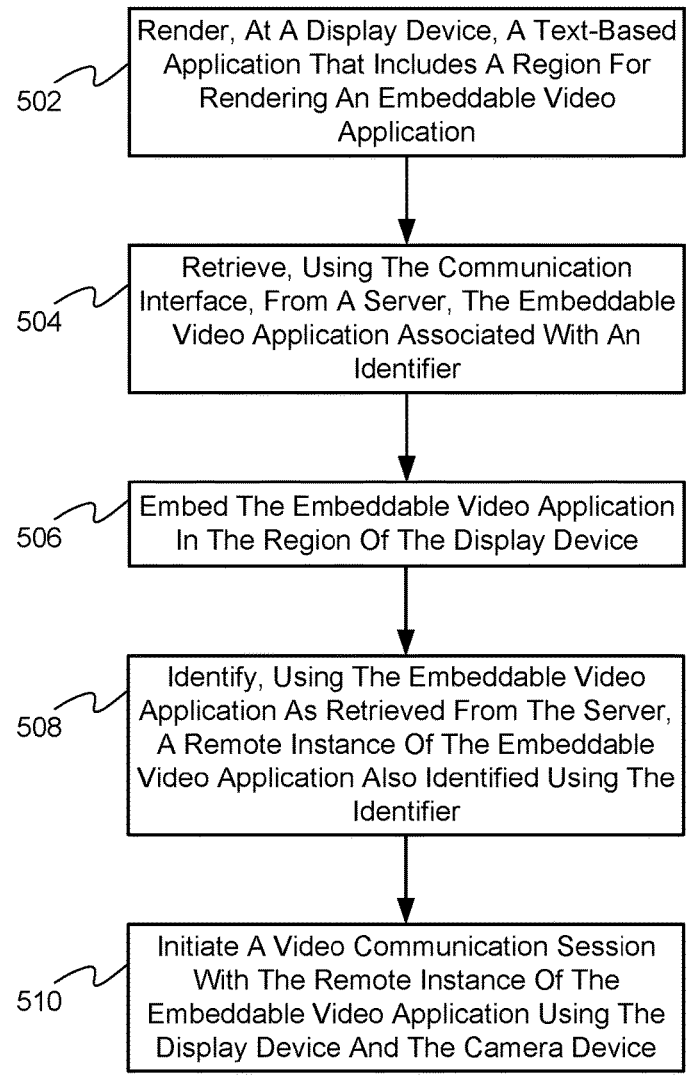
FIG. 5 depicts a flowchart of a method for initiating a video communication session using an embeddable video chat application, in accordance with some embodiments.

Attention is now directed to FIG. 5, which depicts a flowchart of a method 500 for initiating a video communication session using an embeddable video application, according to non-limiting implementations. In order to assist in the explanation of the method 500, it will be assumed that the method 500 is performed using the controller 320 of the device 301, for example when the controller 320 processes the application 323 and the text-based application 123. Indeed, the method 500 is one way in which the device 301 and/or the controller 320 can be configured. Furthermore, the following discussion of method 500 will lead to a further understanding of the device 301, and the system 100, and their various components. However, it is to be understood that the system 100 and/or the device 301 and/or the controller 320 and/or the method 500 can be varied and need not work exactly as discussed herein in conjunction with each other, and that such variations are within the scope of present implementations.

Regardless, it is to be emphasized, that the method 500 need not be performed in the exact sequence as shown, unless otherwise indicated; and likewise, various blocks may be performed in parallel rather than in sequence; hence the elements of the method 500 are referred to herein as "blocks" rather than "steps". It is also to be understood, however, that the method 500 can be implemented on variations of the device 301 as well.

Furthermore, while it is assumed hereafter that the method 500 is performed at the device 301 as embodied by the first device 111, the method 500 may be performed at one or more devices 301, for example at the first device 111, the second device 112 and/or a combination thereof.

At a block 502, the controller 320 renders, at the display device 326, the text-based application 123 that includes a region for rendering the embeddable video chat application 105. For example, the text-based application 123 may comprise a browser rendering a webpage and the region may be defined by an embedding element in the webpage that includes a network address used to retrieve the embeddable video chat application 105 from a server (such as the first server 101), the identifier comprising a parameter of the network address. Alternatively, the text-based application 123 may comprise a text chat application (which may be provided in a browser) and the region may be defined by a network address received as text in the text chat application, the network address used to retrieve the embeddable video chat application from a server (such as the first server 101), the identifier comprising a parameter of the network address.

At a block 504, the controller 320 retrieves, using the communication interface 324, from a server (e.g. the first server 101), the embeddable video chat application 105 associated with an identifier. For example, a user operating the device 301 may use the input device to select the region to initiate retrieving of the embeddable video chat application 105. In some examples, the region may include, for example in an embedding element, the network address of the embeddable video chat application 105, as well as a selectable option, such a virtual button, and the like; when the selectable option is selected, the controller 320 may retrieve the embeddable video chat application 105 using the network address of the embeddable video chat application 105.

In some examples, the controller 320 may receive, using the communication interface 324, the identifier within the region of the text-based application 123, prior to retrieving the embeddable video chat application 105. For example, the identifier may be received as a parameter of the network address of the embeddable video chat application 105. However, the identifier may be received with the embeddable video chat application 105.

At a block 506, the controller 320 embeds the embeddable video chat application 105 in the region of the display device 326, for example in the text-based application 123 such that the display device 326 is rendering the embeddable video chat application 105 in the text-based application 123.

At a block 508, the controller 320 identifies, using the embeddable video chat application 105 as retrieved from the server (e.g. the first server 101), a remote instance of the embeddable video chat application 105 also identified using the identifier. The remote instance of the embeddable video chat application 105 may be identified via the second server 102.

At a block 510, the controller 320 initiates a video communication session with the remote instance of the embeddable video chat application 105 using the display device 326 and the camera device 330. For example, when the device 301 is embodied at the first device 111, the remote instance of the embeddable video chat application 105 may be at the second device 112.

In some examples, the controller 320 initiates the video communication session with the remote instance of the embeddable video chat application 105 using a session identifier supplied to both the embeddable video chat application 105 and the remote instance of the embeddable video chat application 105, as described above.

Furthermore, in some examples, the controller 320 initiates the video communication session with the remote instance of the embeddable video chat application 105 using a second server, such as the second server 102, and the session identifier supplied to both the embeddable video chat application 105 and the remote instance of the embeddable video chat application 105. In these examples, the second server 102 may comprise a video chat server used to assist in configuring a video chat session. For example, each controller 320 at each of the devices 111, 112 may notify the second server 102 that it is ready for a video communication session identified with an identifier, such as a session identifier. The second server 102 notifies each of the controllers 320 at each of the devices 111, 112 of the other in order to facilitate their communication using the session identifier identifying their video communication session; for example, each of the devices 111, 112 may further provide their respective network addresses to the second server 102 with a session identifier and the second server 102 may provide each of the devices 111, 112 with a network address of the other device 111, 112. The devices 111, 112 may then set up a video communication session therebetween, including, but not limited to, directly exchanging video codecs and/or audio codecs and the like (e.g. without further communication with the second server 102).

Examples of the method 400 and the method 500 are next described with reference to FIG. 6 to FIG. 15. Each of FIG. 6 to FIG. 15 are substantially similar to FIG. 1 with like components having like numbers.

Figure 6:
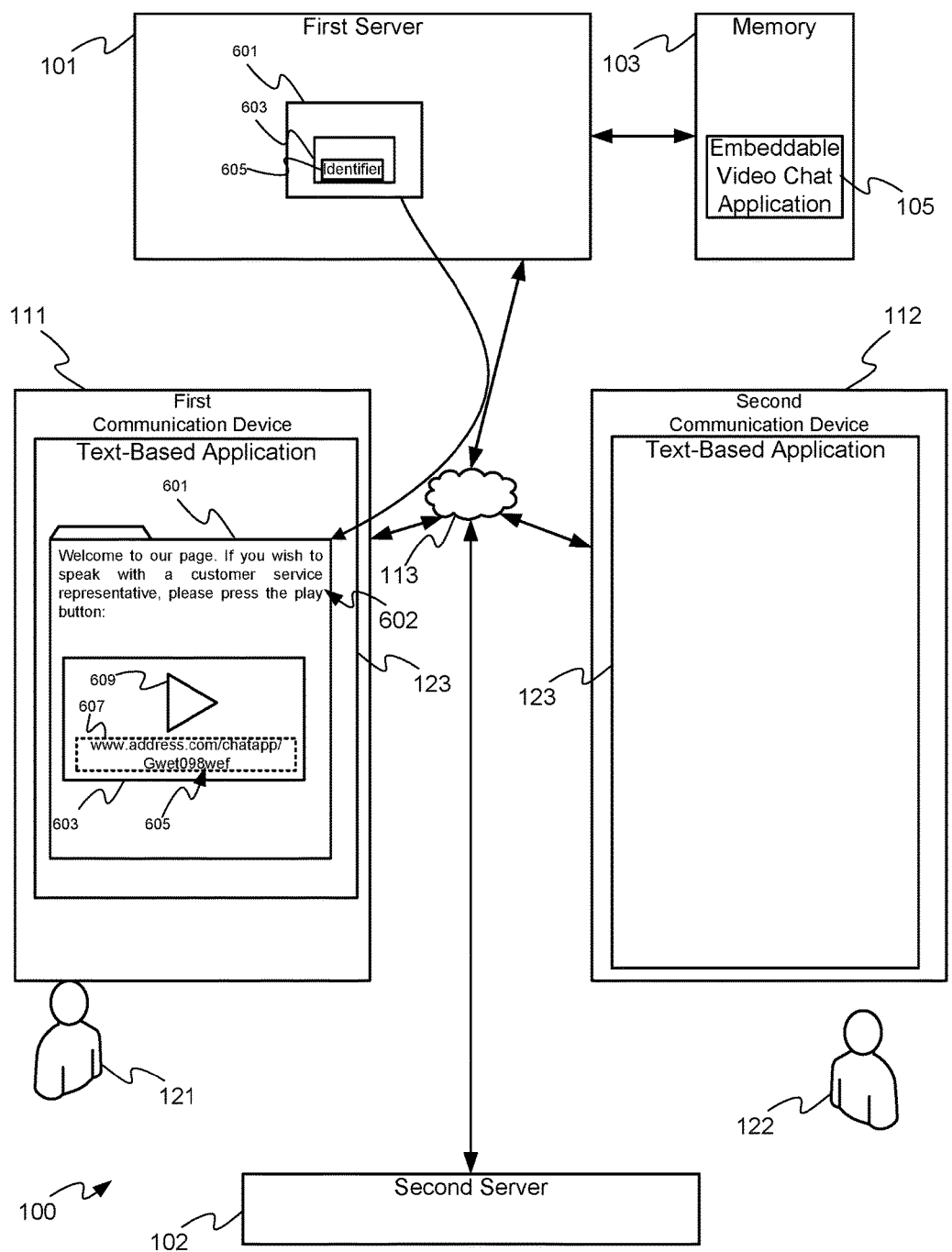
FIG. 6 depicts a device rendering a text-based application that includes a region for rendering an embeddable video chat application, in accordance with some embodiments.

Attention is next directed to FIG. 6 which depicts an example of the block 502 of the method 500. For example, in FIG. 6, the first device 111 is depicted as providing the text-based application 123, for example at a display device thereof (not depicted, but similar to the display device 326), the text-based application 123 including, in this example, a browser rendering a webpage 601. The webpage 601 may be requested, for example, from the first server 101. While the webpage 601 is depicted schematically at the first server 101 (e.g. prior to providing to the first device 111), details of the webpage 601 are depicted in further detail as rendered at the text-based application 123 at the first device 111.

As depicted, the webpage 601 includes a text region 602, and a region 603 that includes an identifier 605 (e.g. as depicted a UUID "Gwet098wef") of the embeddable video chat application 105, the identifier 605 embedded in the region 603, for example, as a parameter of a network address 607 of the embeddable video chat application 105. The first server 101 may be configured to generate the identifier 605 and/or the identifier 605 may be requested from security server, and the like. Regardless, the identifier 605 uniquely and/or cryptographically uniquely identifies an instance of the embeddable video chat application 105 to be embedded in the region 603.

The region 603 may be defined via an embeddable element such as an <iframe> tag, and the like, in the webpage 601. As depicted, the region 603 further includes a selectable option 609 which, when actuated (for example via the user 121 interacting with an input device of the first device 111), causes an instance of the embeddable video chat application 105 to be retrieved via the network address 607, the embeddable video chat application 105 being identified by the identifier 605. However, as depicted in FIG. 6, the text-based application 123 is not yet configured for video chat.

The text region 602 generally includes text and/or graphics (e.g. images) and the like.

As depicted, the second device 112 is also implementing an instance of the text-based application 123 but is not yet configured for video chat.

Figure 7:
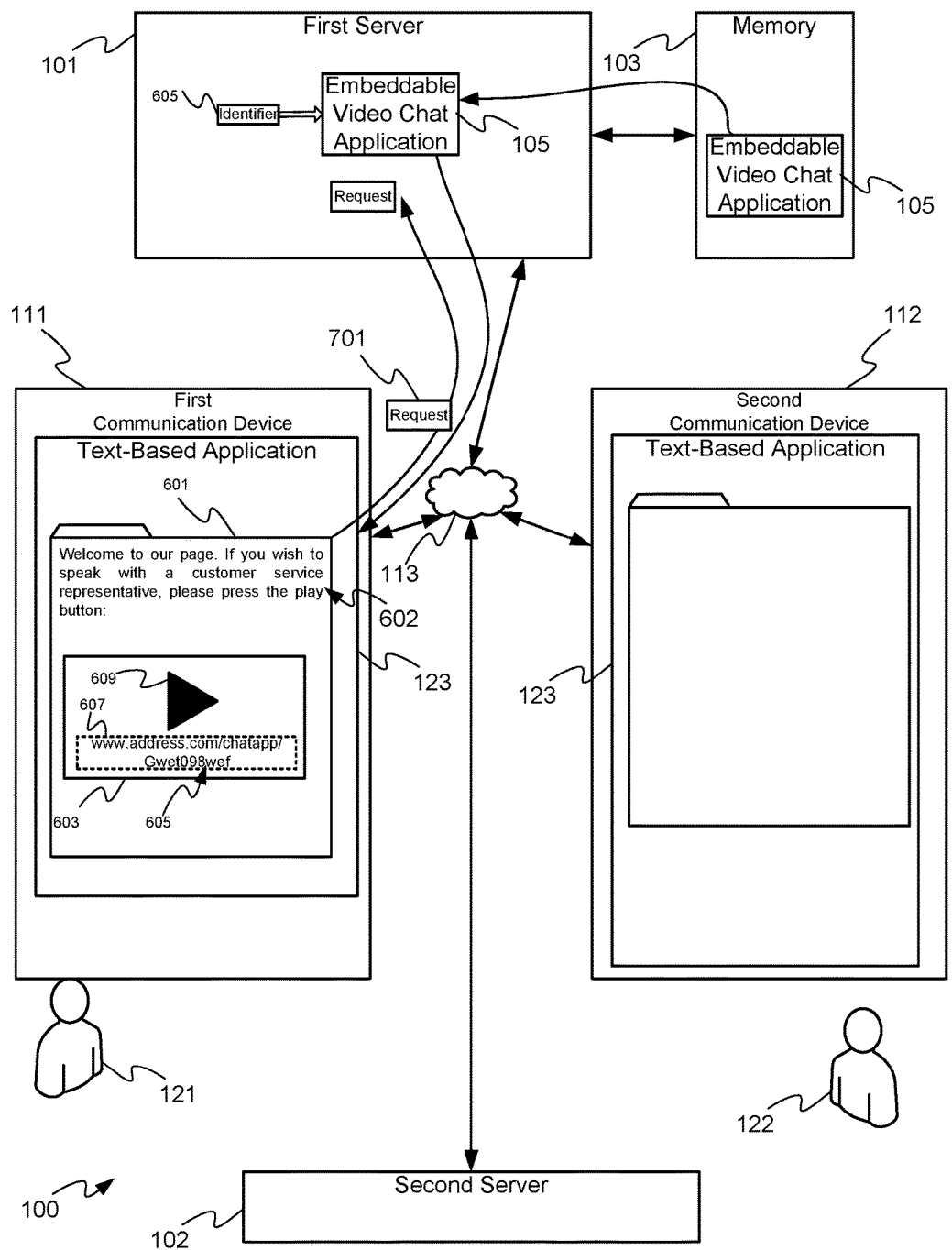
FIG. 7 depicts the device requesting the embeddable video chat application from a server, in accordance with some embodiments.

Attention is next directed to FIG. 7, which depicts an example of the block 402, the block 404 and the block 406 of the method 400, and an aspect of the block 504 of the method 500. In particular, in FIG. 7, the selectable option 609 has been selected (e.g. as indicated by the selectable option 609 changing color as compared to FIG. 6), and the first device 111 transmits (e.g. at the block 504 of the method 500) a request 701 to the first server 101 to retrieve the embeddable video chat application 105, the request 701 including, for example, the network address 607 and the identifier 605. The request 701 is received at the first server 101 (e.g. at the block 402) and the first server 101 retrieves the embeddable video chat application 105 associated with the identifier 605 from the memory 103 (and/or the memory 222), and provides the embeddable video chat application 105 to the first device 111 (e.g. at the block 404).

Figure 8:
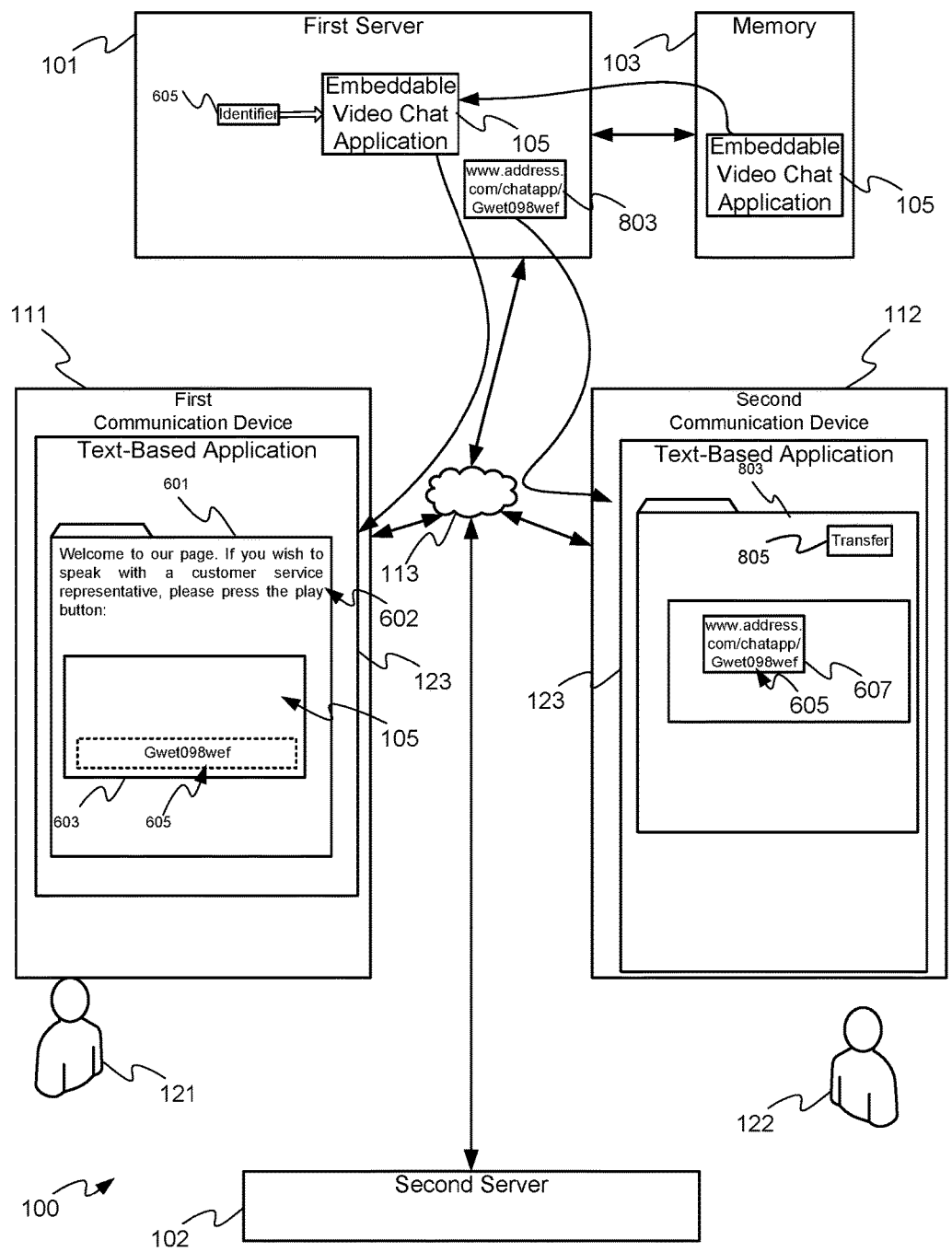
FIG. 8 depicts the server providing the device with the embeddable video chat application identified by an identifier, in accordance with some embodiments.

Attention is next directed to FIG. 8, which depicts an example of a further aspect of the block 504, and the block 506 of the method 500. As depicted, the first device 111 receives the embeddable video chat application 105 (e.g. at the block 504 of the method 500) and embeds (e.g. at the block 506 of the method 500) the embeddable video chat application 105 in the region 603 of the text-based application 123. For example, the text-based application 123, upon receipt of the embeddable video chat application 105, embeds the embeddable video chat application 105 in the region 603 based on the <iframe> tag.

As depicted, first server 101 further transmits a webpage 803 to the second device 112 that includes the network address 607 and the identifier 605. Hence, in these examples, the first server 101 has been preconfigured with the network address of the second device 112, which may occur in examples where the first server 101 and the second device 112 are associated with the same entity.

Furthermore, the webpage 803 may be the same or different from the webpage 601. Indeed, the webpage 803 can be configured for use by the user 122, for example a customer service representative and the like. Hence, the webpage 803 may include virtual buttons, and/or links and the like to be used by the user 122 to implement customer service representative functionality, including, but not limited to, an optional virtual button 805 for transferring a video communication session to another customer service representative, such as a supervisor, and the like.

Figure 9:
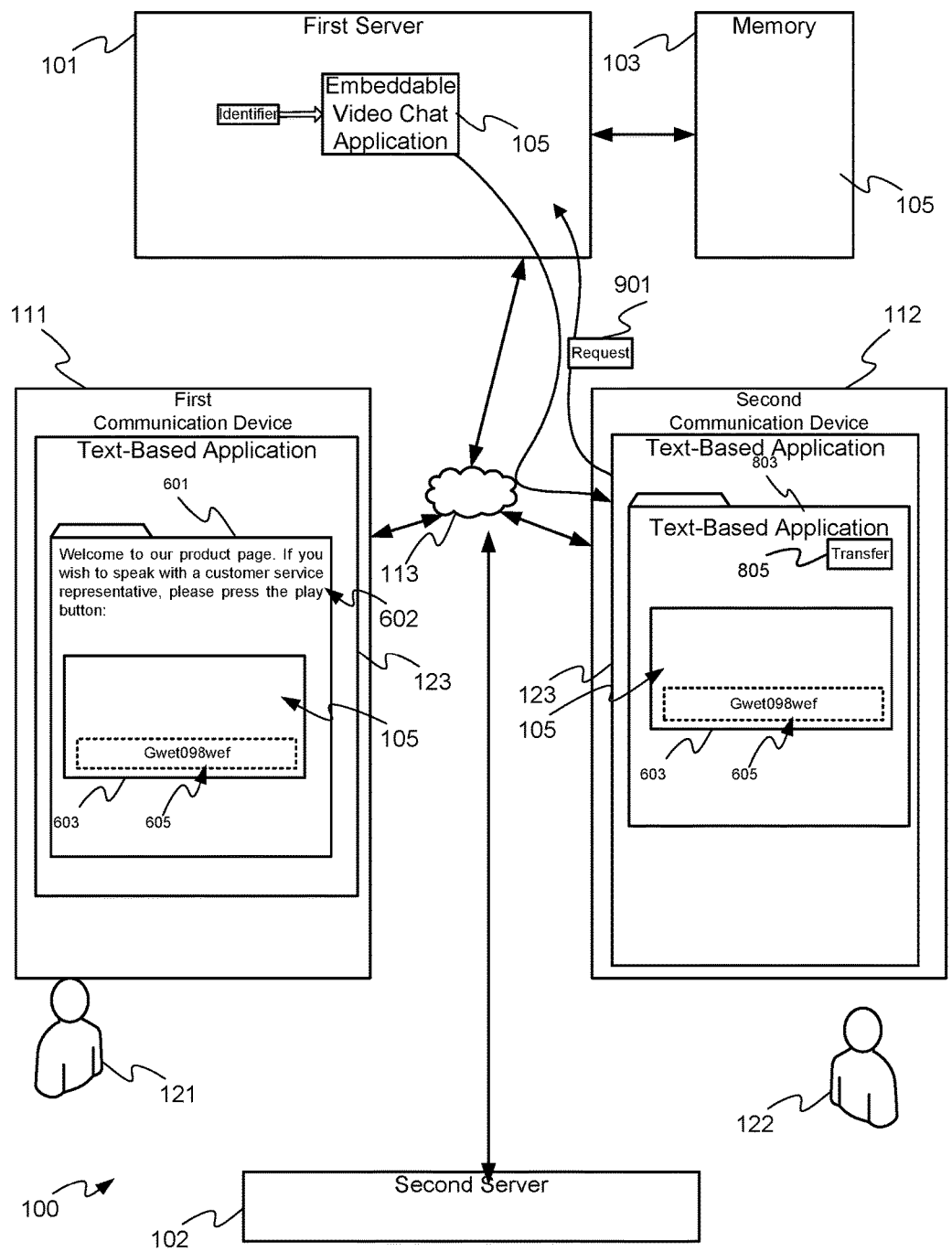
FIG. 9 depicts the server providing a second device with the embeddable video chat application identified by the identifier, in accordance with some embodiments.

Upon receiving the webpage 803, the webpage 803 may be provided in the text-based application 123 at the second device 112, and the user 122 of the second device 112 may actuate the network address 607 in the webpage 803. With reference to FIG. 9, upon actuation of the network address 607 in the webpage 803, the second device 112 may transmit a request 901 for the embeddable video chat application 105 to the first server 101, similar to the request 701, and the first server 101 may provide (e.g. at the block 406 of the method 400) the embeddable video chat application 105 to the second device 112 as identified by the identifier 605. Each instance of the embeddable video chat application 105 at each of the devices 111, 112 is hence associated with the same identifier 605 which is generally unique to these instances of the embeddable video chat application 105. Indeed, when two other devices are attempting to communicate according to the method 400 and the method 500, the embeddable video chat application 105 will be associated with a different identifier.

Figure 10:
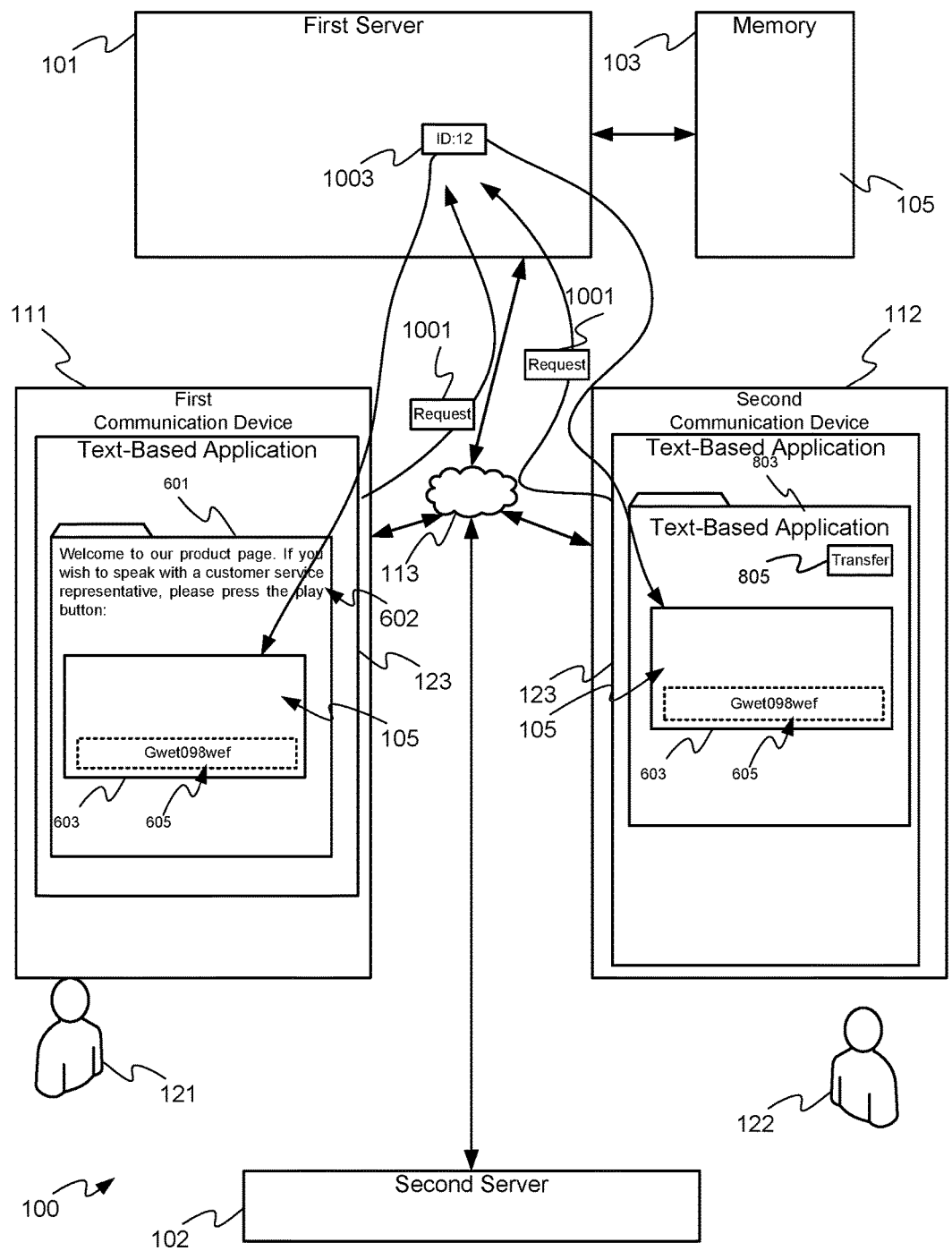
FIG. 10 depicts the embeddable video chat application at each of the devices optionally requesting a session identifier from the server, in accordance with some embodiments.

With reference to FIG. 10, upon receiving the embeddable video chat application 105, the second device 112 may open the text-based application 123 and render the embeddable video chat application 105, as identified by the identifier 605, in a respective region 603 of the text-based application 123. In some examples, the embeddable video chat application 105 is transmitted to the second device 112 embedded in a webpage.

With further reference to FIG. 10, in some optional examples, the embeddable video chat application 105, once embedded in each instance of the text-based application 123 at each of the devices 111, 112, may transmit a respective request 1001 for a session identifier 1003 to the first server 101, as described above. The first server 101 may generate and return the session identifier 1003 to each instance of the embeddable video chat application 105 at each of the devices 111, 112. The session identifier 1003 may identify a current session for the embeddable video chat application 105 and/or a current manifest. Alternatively, the session identifier 1003 may be provided to the devices 111, 112 with the embeddable video chat application 105, for example in response to the request 701 and without the additional requests 1001.

Figure 11:
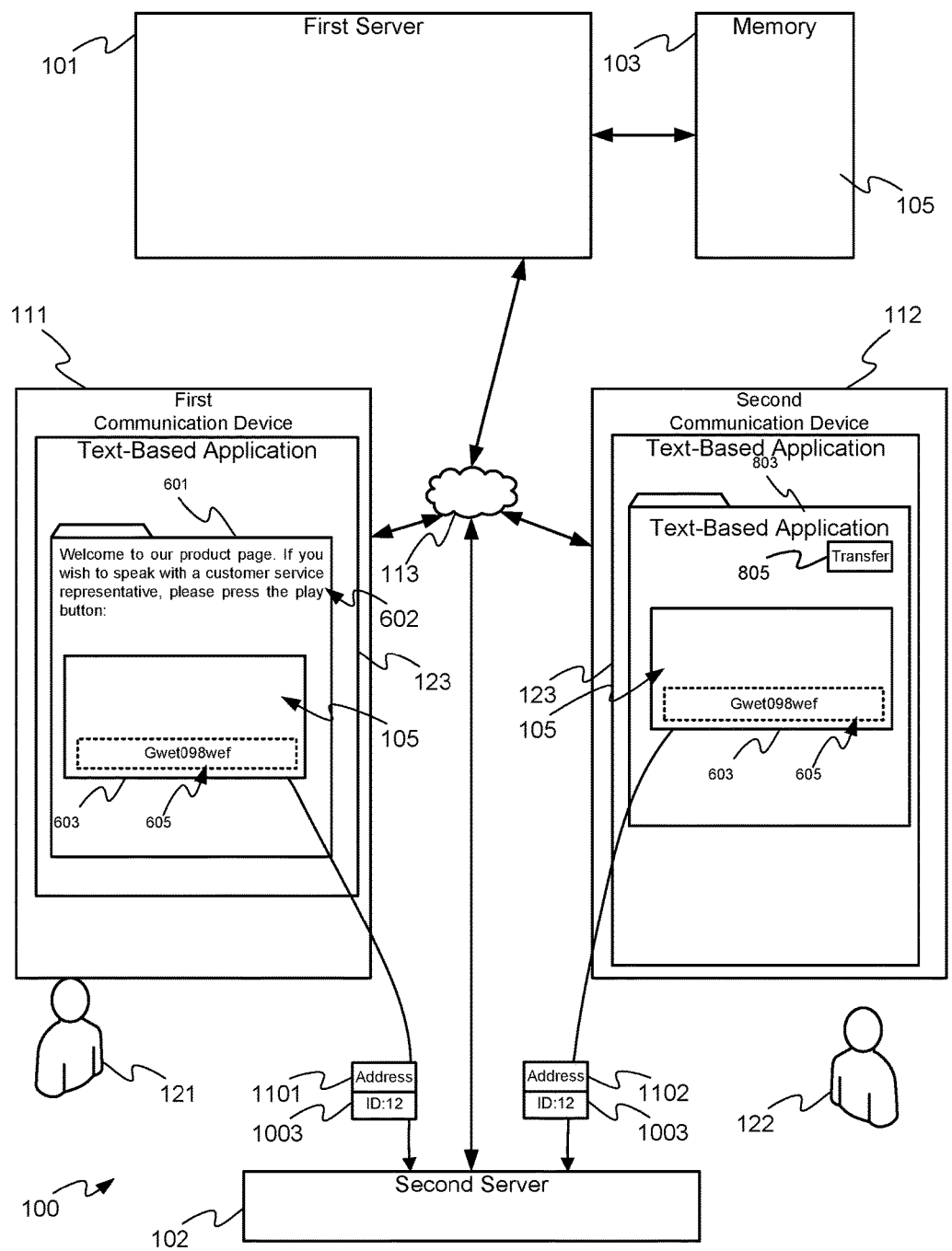
FIG. 11 depicts the embeddable video chat application at each of the devices using the identifier and the session identifier to initiate a video communication session therebetween via a second server, in accordance with some embodiments.

With reference to FIG. 11, each instance of the text-based application 123 at each of the devices 111, 112, may respectively transmit the session identifier 1003 (and optionally the identifier 605) to the second server 102 along with, for example, a respective network address 1101, 1102 of each of the devices 111, 112. Transmission of the session identifier 1003 and the respective network addresses 1101, 1102 to the second server 102 by the devices 111, 112 may assist the device 111 to identify (e.g. at the block 508 of the method 500), using the embeddable video application 105 as retrieved from the first server 101, a remote instance of the embeddable video chat application 105 (e.g. at the second device 112) also identified using the session identifier 1003.

Figure 12:
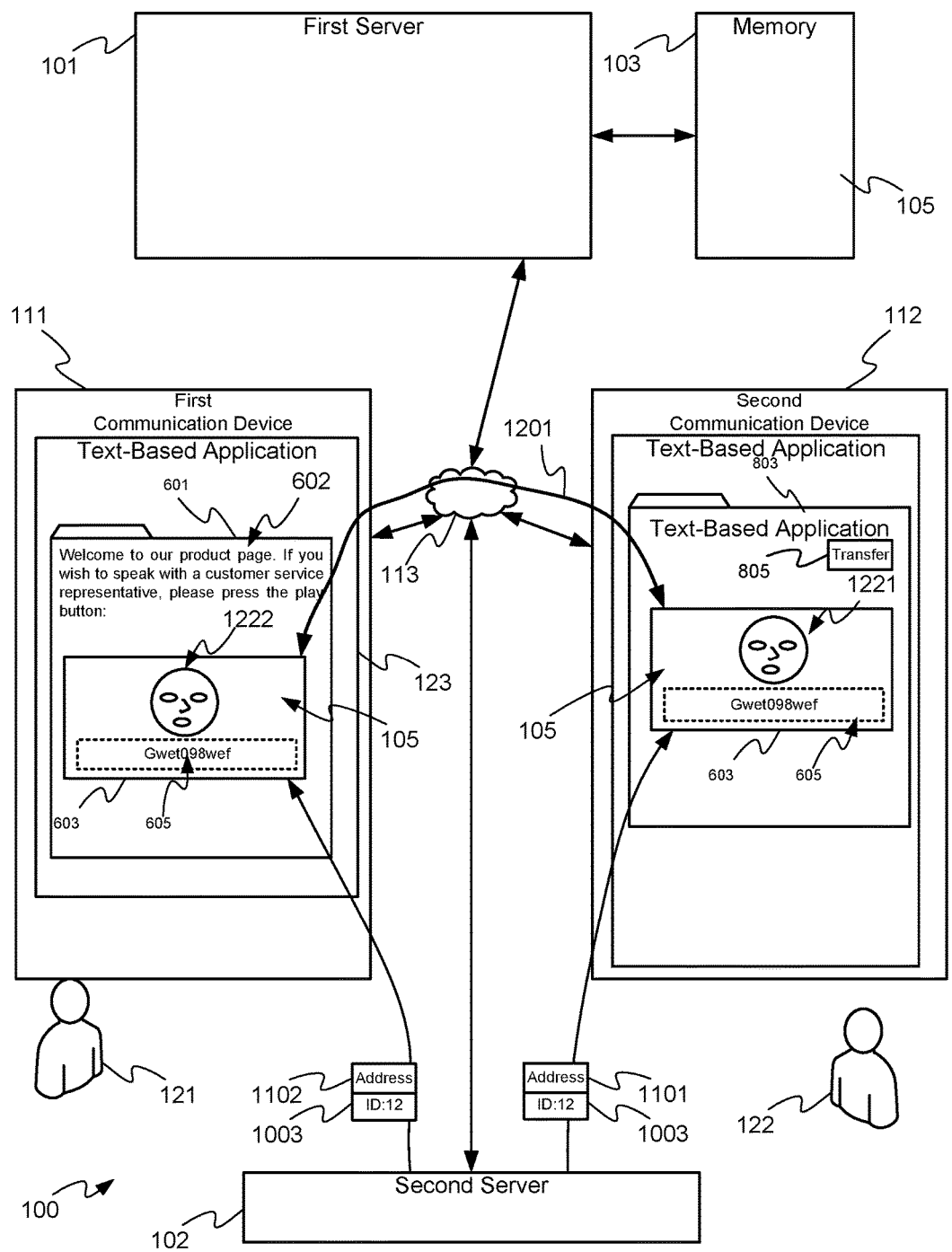
FIG. 12 depicts the embeddable video chat application at each of the devices using conducting the video communication session therebetween, in accordance with some embodiments.

With reference to FIG. 12, the second server 102 may assist the devices 111, 112 in identifying that they are attempting to initiate and conduct a video communication session with each other, and assist each instance of the embeddable video chat application 105 at the devices 111, 112 in a video communication session 1201. For example, as depicted, the second server 102 may transmit, to the first device 111, the network address 1102 of the second device 112 and transmit, to the second device 112, the network address 1101 of the first device 111. As depicted, the network addresses 1101, 1102 are optionally transmitted with the session identifier 1003. The devices 111, 112 then use the network addresses 1101, 1102 to directly set up the video communication session 1201 via the network 113. Directly setting up the video communication session 1201 may include, but is not limited to, exchanging video codecs and/or audio codecs between the devices 111, 112. Regardless, exchange of video data occurs between the devices 111, 112 to initiate (e.g. at the block 510) the video communication session 1201 using, for example a respective display device and camera (e.g. a respective display device 326 and a respective camera device 330) at each of the devices 111, 112. Hence, in FIG. 12, the embeddable video chat application 105 at the device 111 is rendering an image 1222 of the user 122, and the embeddable video chat application 105 at the device 112 is rendering an image 1221 of the user 121.

Once the video communication session 1201 ends, the embeddable video chat application 105 may be deactivated (and/or deleted) from each of the devices 111, 112, for example when the text-based application 123 is closed and/or an associated webpage (e.g. the webpage 601) is closed. Indeed, the embeddable video chat application 105 may be deactivated (e.g. stored at least temporarily in a memory cache and the like), but not deleted in the vent that a video communication session ends and/or us suspended and/or is deactivated and is later resumed. Indeed, in contrast to prior art solutions for setting up a video communication session, there is no need to install a dedicated video chat application and/or browser plug-in at each of the devices 111, 112, nor is there any need to conduct a video communication session in a dedicated platform (e.g. a dedicated video chat application and/or browser plug). Rather, setting up video communication session as described with reference to FIG. 6 to FIG. 12 may occur on a one-time basis using the embeddable video chat application 105 and the identifier 605.

Furthermore, the depicted examples include the virtual button 805 at the webpage 803 at the device 112, and the like, for transferring the video communication session 1201 to another user and/or a third device (such as a device similar to the device 112, not depicted, associated with a supervisor of the user 122). Hence, for example, when the virtual button 805 is actuated, for example via the user 122 via an input device, the device 112 may: end the video communication session 1201; transmit the network address 607 with the identifier 605 to the third device to trigger the third device to implement the method 500; and further transmit a message, and the like, to the device 111 to trigger the device 111 to repeat at least the block 510 of the method 500 to set up a second video communication session between the device 111 and the third device. Hence, the third device will also embed the embeddable video chat application 105 at a text-based application local to the third device, and the video communication session 1201 is effectively transferred to the third device; hence, the controller 220 may be generally configured to transfer the video communication session 1201 to another remote instance of the embeddable video chat application 105 (e.g. at the third device) which may include ending the video communication session 1201 and setting up the second video communication session. A new session identifier may be generated in this process and used to set up the second video communication session with the assistance of the second server 102, as described previously.

Alternatively, rather than transfer the video communication session 1201 to a third device, the third device may be added to the video communication session 1201 by repeating the method 500 at the third device using the same session identifier in use with the video communication session 1201. Indeed, the method 500 may occur at a plurality of devices, similar to the device 101, such that plurality of devices may all be in communication with each other during one video communication session; furthermore other devices may be added to the video communication session as described above, and/or devices presently in the video communication session may end their participation in the video communication session, for example by closing a local instance of text-based application with the embeddable video chat application 105 embedded therein. Hence, the method 400 and the method 500 may be adapted to provide group video communication sessions without each device participating in the group video communication having to install dedicated video chat applications and/or browser plug-ins prior to conducting such group video communication sessions.

The example in FIG. 6 to FIG. 12 shows one scenario for setting up a video communication session using the embeddable video chat application 105. However, other examples for setting up a video communication session is within the scope of the present specification. For example, attention is next directed to FIG. 13 to FIG. 14 which depicts the second device 112 initiating a video communication session.

Figure 13:
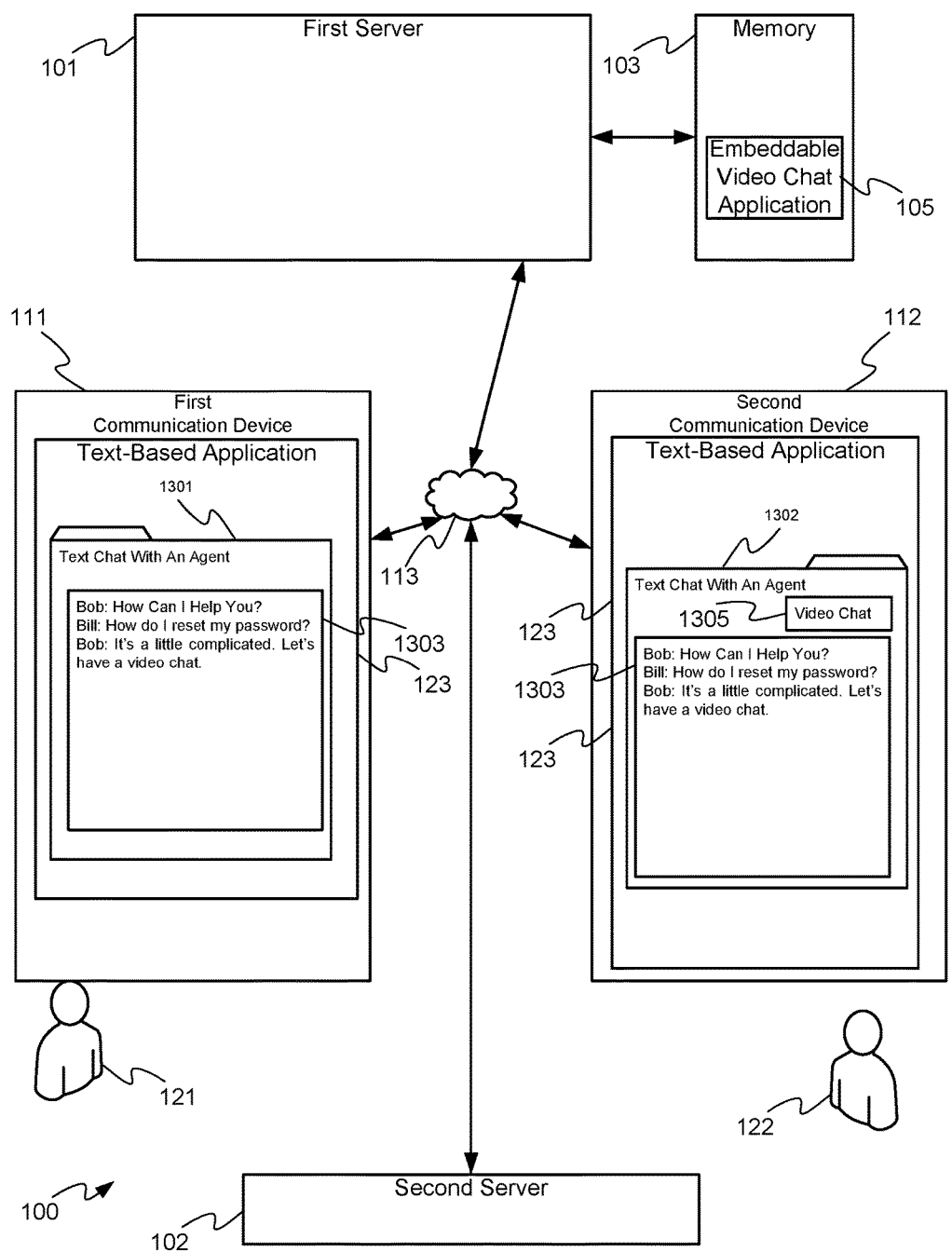
FIG. 13 depicts each of the devices rendering a text-chat application, in accordance with some embodiments.

In FIG. 13, each of the devices 111, 112 are rendering the text-based application 123 embodied as a respective browser each of which has downloaded a respective webpage 1301, 1302 (e.g. from the first server 101), which includes a respective a text-chat application 1303. Webpages 1301, 1302 may otherwise be the same or different from one another. For example, the webpage 1301 may be specifically configured for users browsing the Internet, while the webpage 1302 may be configured for customer service representatives. Regardless, the users 121, 122 are interacting with input devices of their respective devices 111, 112 to conduct a text chat in a text chat session; for example, the user 122 may be a customer service representative assisting the user 121 in resetting a password.

The webpages 1301, 1302 are similar, however the webpage 1302 includes a selectable option 1305 which, when actuated using an input device may transmit, to the device 111, within the text-chat application 1303, a region for embedding the embeddable video chat application 105.

Figure 14:
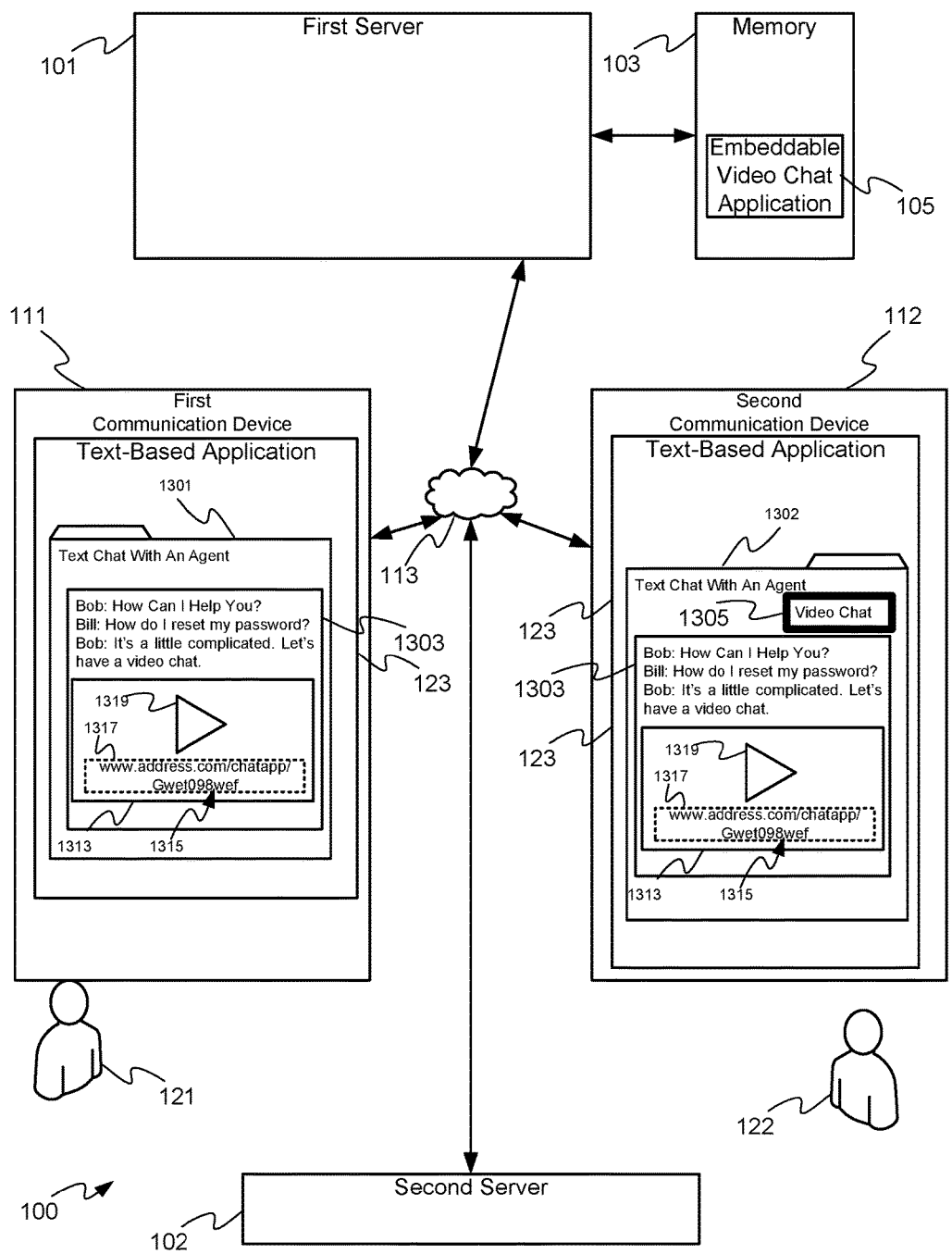
FIG. 14 depicts the second device initiating a video communication session, in accordance with some embodiments.

For example, attention is next directed to FIG. 14 which depicts the selectable option 1305 being actuated (e.g. as indicated by the selectable option 1305 being depicted in a heavier width as compared to FIG. 13). When the selectable option 1305 is actuated the text-chat application 1303 may request a network address 1317 of the embeddable video chat application 105 from the first server 101 along with an identifier 1315 of the embeddable video chat application 105, which may be unique to the text chat session.

The text-chat application 1303 at the device 112 may generate a region 1313, similar to the region 603, associated with the identifier 1315 of the embeddable video chat application 105 and the network address 1317. In some examples, the embeddable video chat application 105 associated with the identifier 1315 is automatically retrieved at each of the devices 111, 112 when the regions 1313 are generated. Each region 1313 at each of the devices 111, 112 includes a selectable option 1319 which, when respectively actuated causes a respective device 111, 112 to initiate a video communication session as described above with respect to FIGS. 9 to 12 including, but not limited to, retrieving a session identifier from the first server 101 for use in setting up the video communication session. As in the examples of FIG. 6 to FIG. 12, the embeddable video chat application 105 may generally be deleted from each of the devices 111, 112 when the respective text-based applications 123 are closed and/or when the respective webpages 1301, 1302 are closed.

Figure 15:
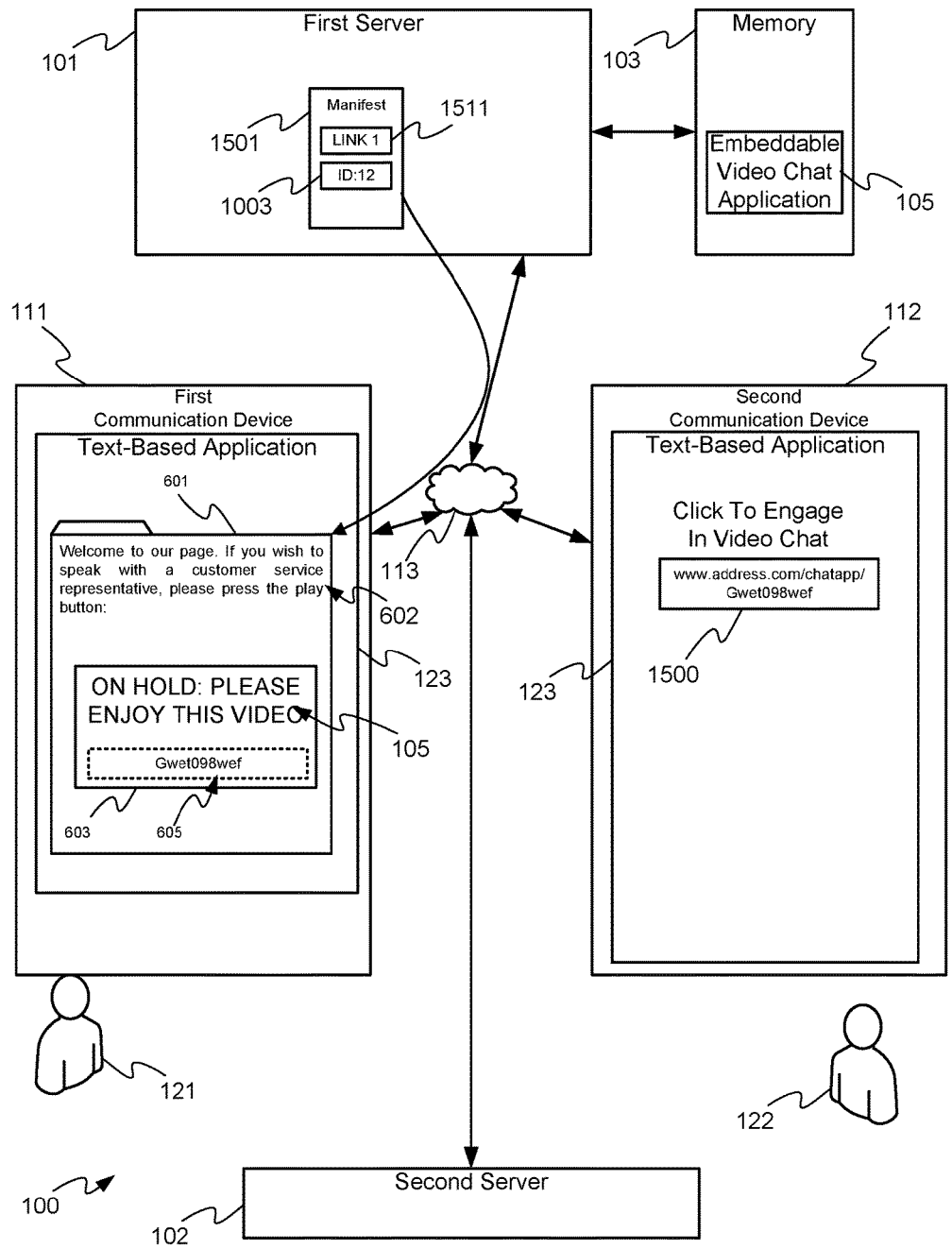
FIG. 15 depicts the device being placed on hold prior to a video communication session being initiated, in accordance with some embodiments.

Attention is next directed to FIG. 15 which depicts yet another alternative example of aspects of the method 400 and the method 500. In FIG. 15, the device 111 has downloaded the embeddable video chat application 105 to the region 603, as in FIG. 8. However, the device 112 is not presently ready to engage in a video communication session; for example, the user 122 and/or the device 112 may be engaged in another video communication session and/or a text chat session. However, the device 112 is provided with the network address of the embeddable video chat application 105 associated with the identifier 605 which is rendered at the device 112, for example in a webpage of the text-based application 123, as a selectable option 1500. When the selectable option 1500 is selected, the embeddable video chat application 105 associated with the identifier 605 may be retrieved as described above.

However, until the embeddable video chat application 105 associated with the identifier 605 is retrieved by the device 112, the embeddable video chat application 105 associated with the identifier 605 at the device 111 may be placed on "hold" by providing the embeddable video chat application 105 with a manifest 1501 that includes a list of videos to be played by the embeddable video chat application 105 in form of links to the video to be played. As depicted, the first video may be retrieved via a link 1511 (e.g. to storage location of the first video, such as in the memory 103); however, the second "link: in the manifest 1511 may be the session identifier 1003. Once the video retrieved via the link 1511 is played, the embeddable video chat application 105 may initiate the video communication session via the session identifier 1003 as described above, presuming that the device 112 is ready to engage in the video communication session. However, when the device 112 is not ready to engage in the video communication session, the manifest 1501 may be updated with additional links to other videos and/or the same video identified by the link 1511, to move the session identifier 1003 further down the list in the manifest 1501. Indeed, in some examples, the session identifier 1003 is not included in the manifest until the device 112 is ready to engage in the video communication session.

Described herein is device, system and method for embedded video chat in which instances of an embeddable video chat application are provided to each of two devices on as-needed basis in a text-based application (e.g. in a webpage and/or a text chat application) with an identifier that identifies the embeddable video chat application at each of the devices for a given video communication session. The embeddable video chat application may generally be deleted from each of the two devices when the respective text-based applications are closed and/or when respective webpages are closed. Furthermore, use of the embeddable video chat application in a text-based application, as described herein, may obviate a need for each of the devices to install dedicated video chat applications and/or browser plug-ins prior to conducting a video communication session.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . . " and "one or more . . . " language.

The terms "about", "substantially", "essentially", "approximately", and the like, are defined as being "close to", for example as understood by persons of skill in the art. In some implementations, the terms are understood to be "within 10%," in other implementations, "within 5%", in yet further implementations, "within 1%", and in yet further implementations "within 0.5%".

Those skilled in the art will appreciate that in some implementations, the functionality of devices and/or methods and/or processes described herein can be implemented using pre-programmed hardware or firmware elements (e.g., application specific integrated circuits (ASICs), electrically erasable programmable read-only memories (EEPROMs), etc.), or other related components. In other implementations, the functionality of the devices and/or methods and/or processes described herein can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A device comprising:
a communication interface; and
a controller configured to communicate with a display device and a camera device, the controller further configured to:
render, at the display device, a text-based application that includes a region for rendering an embeddable video chat application, the region including:
a network address used to retrieve an instance of the embeddable video chat application from a server, the instance of the embeddable video chat application identified by an identifier at the server, and the identifier comprising a parameter of the network address; and
a selectable option, which, when actuated, causes the instance of the embeddable video chat application to be retrieved using the network address and the identifier;
when the selectable option is actuated, retrieve, using the communication interface, from the server, the instance of the embeddable video chat application as identified by the identifier;
embed the instance of the embeddable video chat application in the region of the display device;
identify, using the instance of the embeddable video chat application as retrieved from the server, a remote instance of the embeddable video chat application also identified using the identifier; and
initiate a video communication session between the instance of the embeddable video chat application and the remote instance of the embeddable video chat application using the display device and the camera device.

2. The device of claim 1, wherein the text-based application comprises one or more of:
a non-video application;
a non-video chat application;
a webpage that includes the region for rendering the embeddable video chat application;
a browser for rendering the webpage; and
a text chat application.

3. The device of claim 1, wherein the identifier comprises one or more of:
a cryptographically unique identifier; and
a universally unique identifier (UUID).

4. The device of claim 1, wherein the text-based application comprises a browser rendering a webpage and the region is defined by an embedding element in the webpage that includes the network address.

5. The device of claim 1, wherein the text-based application comprises a text chat application and the region is defined by the network address received as text in the text chat application.

6. The device of claim 1, wherein the controller is further configured to:
receive, using the communication interface, the identifier within the region of the text-based application, prior to retrieving the instance of the embeddable video chat application.

7. The device of claim 1, wherein the controller is further configured to:
initiate the video communication session with the remote instance of the embeddable video chat application using a session identifier supplied to both the instance of the embeddable video chat application and the remote instance of the embeddable video chat application.

8. The device of claim 1, wherein the controller is further configured to:
initiate the video communication session with the remote instance of the embeddable video chat application using a second server and a session identifier supplied to both the instance of the embeddable video chat application and the remote instance of the embeddable video chat application.

9. The device of claim 1, wherein the controller is further configured to transfer the video communication session to another remote instance of the embeddable video chat application.

10. A method comprising:
rendering, using a controller, at a display device, a text-based application that includes a region for rendering an embeddable video chat application, the controller configured to communicate with a communication interface, the display device and a camera device, the region including:
a network address used to retrieve an instance of the embeddable video chat application from a server, the instance of the embeddable video chat application identified by an identifier at the server, and the identifier comprising a parameter of the network address; and
a selectable option, which, when actuated, causes the instance of the embeddable video chat application to be retrieved using the network address and the identifier;
when the selectable option is actuated, retrieving, at the controller, using a communication interface from the server, the instance of the embeddable video chat application as identified by the identifier;
embedding, using the controller, the instance of the embeddable video chat application in the region of the display device;
identifying, at the controller, using the instance of the embeddable video chat application as retrieved from the server, a remote instance of the embeddable video chat application also identified using the identifier; and
initiating, at the controller, a video communication session between the instance of the embeddable video chat application and the remote instance of the embeddable video chat application using the display device and the camera device.

11. The method of claim 10, wherein the text-based application comprises one or more of:
a non-video application;

a non-video chat application;
a webpage that includes the region for rendering the embeddable video chat application;
a browser for rendering the webpage; and
a text chat application.

12. The method of claim 10, wherein the identifier comprises one or more of:
a cryptographically unique identifier; and
a universally unique identifier (UUID).

13. The method of claim 10, wherein the text-based application comprises a browser rendering a webpage and the region is defined by an embedding element in the webpage that includes the network address.

14. The method of claim 10, wherein the text-based application comprises a text chat application and the region is defined by the network address received as text in the text chat application.

15. The method of claim 10, further comprising:
receiving, at the controller, using the communication interface, the identifier within the region of the text-based application, prior to retrieving the instance of the embeddable video chat application.

16. The method of claim 10, further comprising:
initiating, at the controller, the video communication session with the remote instance of the embeddable video chat application using a session identifier supplied to both the instance of the embeddable video chat application and the remote instance of the embeddable video chat application.

17. The method of claim 10, further comprising:
initiating, at the controller, the video communication session with the remote instance of the embeddable video chat application using a second server and a session identifier supplied to both the instance of the embeddable video chat application and the remote instance of the embeddable video chat application.

18. The method of claim 10, further comprising:
transferring the video communication session to another remote instance of the embeddable video chat application.

19. A system comprising:
a server having access to at least one memory storing an embeddable video chat application;
a first device; and
a second device,
the server configured to:
receive, from the first device, a request for a first instance of the embeddable video chat application, the request including an identifier that identifies the first instance of the embeddable video chat application at the server, the identifier being a parameter of a network address used to retrieve the first instance of the embeddable video chat application;
provide, to the first device, the first instance of the embeddable video chat application as identified by the identifier; and
provide, to the second device, a second instance of the embeddable video chat application also identified by the identifier, such that the embeddable video chat application is respectively embedded in a respective text-based application at each of the first device and the second device as, respectively, the first instance of the embeddable video chat application and the second instance of the embeddable video chat application, the respective text-based application including a region for rendering the embeddable video chat application at a display device, the first instance and the second instance of the embeddable video chat application at, respectively, the first device and the second device using the identifier to initiate a video communication session therebetween, the region including:
a network address used to retrieve a respective instance of the embeddable video chat application from the server; and
a selectable option, which, when actuated, causes the respective instance of the embeddable video chat application to be retrieved using the network address and the identifier.

20. The system of claim 19, wherein the text-based application comprises one or more of:
a non-video application;
a non-video chat application;
a webpage that includes the region for rendering the embeddable video chat application;
a browser for rendering the webpage; and
a text chat application.

21. The system of claim 19, wherein the identifier comprises one or more of:
a cryptographically unique identifier; and
a universally unique identifier (UUID).

22. The system of claim 19, wherein each of the first instance and the second instance of the embeddable video chat application is one or more of different versions and different types of embeddable video chat applications.

* * * * *